(12) United States Patent
Reid (10) Patent No.: US 7,945,762 B2
(45) Date of Patent: May 17, 2011

(54) METHOD AND APPARATUS FOR MEMORY MANAGEMENT IN A NON-VOLATILE MEMORY SYSTEM USING A BLOCK TABLE

(75) Inventor: Robert Alan Reid, Superior, CO (US)

(73) Assignee: Cadence Design Systems, Inc., San Jose, CA (US)

( * ) Notice: Subject to any disclaimer, the term of this patent is extended or adjusted under 35 U.S.C. 154(b) by 470 days.

(21) Appl. No.: 12/022,138

(22) Filed: Jan. 29, 2008

(65) Prior Publication Data

US 2009/0193221 A1 Jul. 30, 2009

(51) Int. Cl.
*G06F 12/02* (2006.01)
(52) U.S. Cl. ........................................................ 711/207
(58) Field of Classification Search .................. 711/165, 711/170, 200, 202–203, 206–207, 221, E12.002, 711/E12.007, E12.008, E12.014
See application file for complete search history.

(56) References Cited

U.S. PATENT DOCUMENTS

2006/0155917 A1* 7/2006 Di Sena et al. ............... 711/103
2007/0276988 A1* 11/2007 Luo et al. ...................... 711/103

* cited by examiner

*Primary Examiner* — Jasmine Song
(74) *Attorney, Agent, or Firm* — Patent Venture Group; Joe A. Brock, II (57) ABSTRACT

An invention is provided for memory management in a non-volatile memory which includes a plurality of memory blocks. The invention includes loading a block table from a memory block of the non-volatile memory into system memory, where the block table includes, inter alia, a plurality of entries mapping a physical block address of the non-volatile memory to a logical block address of the non-volatile memory. The block table is updated as data is accessed in the non-volatile memory, and the updated block table is stored into a memory block of the non-volatile memory. Generally, the block table is stored periodically and/or at system shutdown.

19 Claims, 9 Drawing Sheets

FIG. 1
(Prior Art)

| Physical Address | Logical Address |
|---|---|
| Page 0 | 4 |
| Page 1 | 61 |
| Page 2 | 63 |
| Page 3 | 2 |
| Page 4 | 62 |
| • | • |
| Page 61 | 3 |
| Page 62 | 0 |
| Page 63 | 1 |

FIG. 2A
(Prior Art)

| Logical Address | Physical Address |
|---|---|
| Logical Page 0 | 62 |
| Logical Page 1 | 63 |
| Logical Page 2 | 3 |
| Logical Page 3 | 61 |
| Logical Page 4 | 0 |
| • | • |
| Logical Page 61 | 1 |
| Logical Page 62 | 4 |
| Logical Page 63 | 2 |

| Logical Block Address | Memory Block Status Flags | Physical Block Address | Wear Level |
|---|---|---|---|
| 0 | in use | 62 | 50 |
| 1 | in use | 4093 | 155 |
| 2 | in use | 5 | 250 |
| 3 | in use | 4095 | 45 |
| 4 | in use | 1 | 35 |
| 5 | in use | 0 | 25 |
| ● | ● | ● | ● |
| ● | ● | ● | ● |
| ● | ● | ● | ● |
| ● | ● | ● | ● |
| ● | ● | ● | ● |
| ● | ● | ● | ● |
| ● | ● | ● | ● |
| 4093 | Free | 4094 | 5 |
| 4094 | Free | 2 | 15 |
| 4095 | in use | 3 | 205 |

METHOD AND APPARATUS FOR MEMORY MANAGEMENT IN A NON-VOLATILE MEMORY SYSTEM USING A BLOCK TABLE

BACKGROUND OF THE INVENTION

1. Field of the Invention

This invention relates generally to non-volatile memory, and more particularly to providing memory management in a non-volatile memory system using a block table stored in non-volatile memory.

2. Description of the Related Art

In general, non-volatile memory is memory that stores data when power is disconnected from the system. Phase-change memory (PCM) and flash memory are examples of non-volatile computer memory in use today. Flash memory is a non-volatile computer memory that can be electrically erased and reprogrammed. Because flash memory retains stored data even when power to the memory is turned off, flash memory is widely used in battery-driven portable devices. For example, flash memory often is utilized in digital audio players, digital cameras, mobile phones, and USB flash drives, which are used for general storage and transfer of data between computers.

Figure 1:
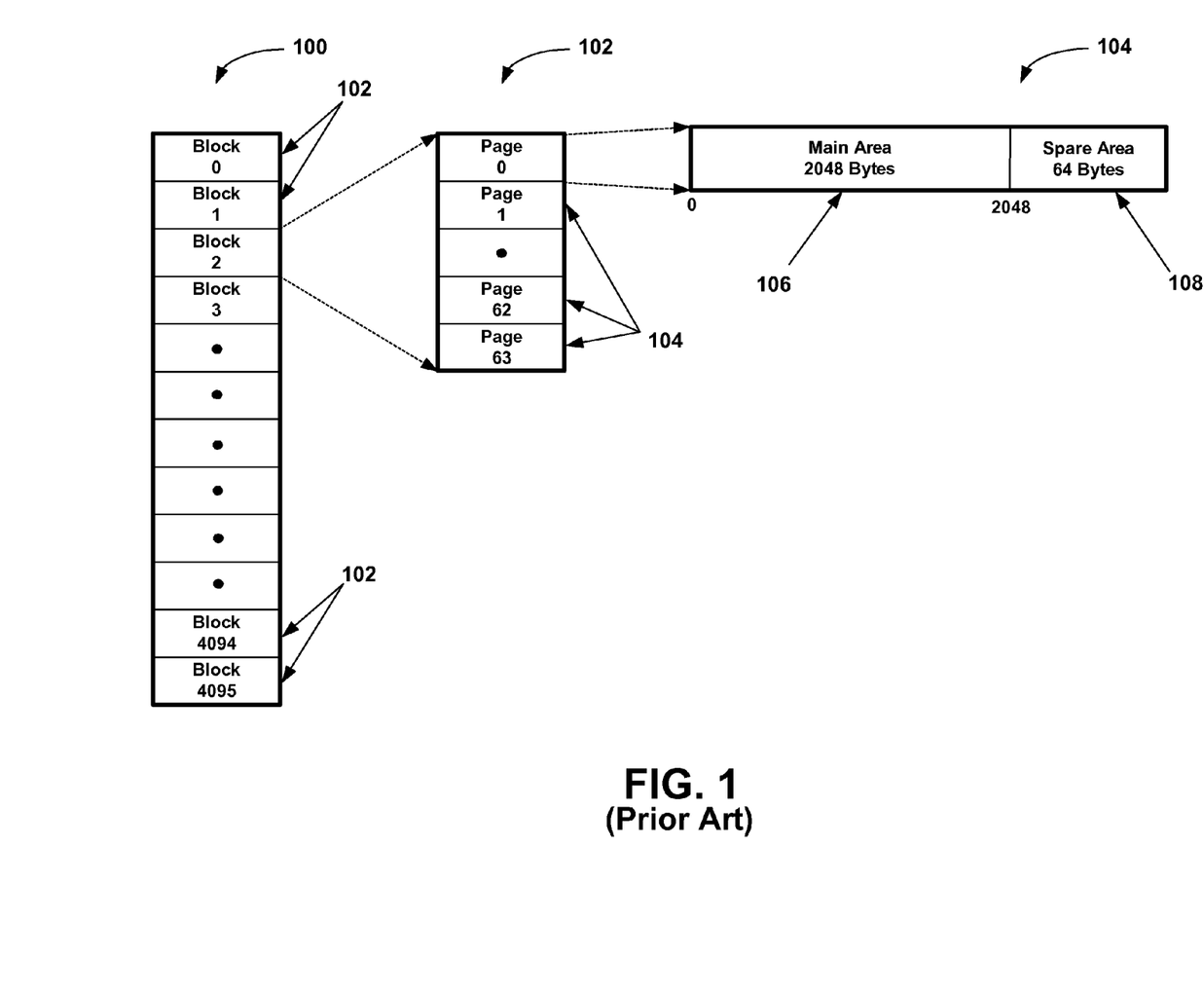
FIG. 1 is an illustration showing a typical prior art non-volatile memory arrangement.

FIG. 1 is an illustration showing a typical prior art non-volatile memory arrangement. As illustrated in FIG. 1, a non-volatile memory 100 generally comprises a plurality of memory blocks 102, which generally is the smallest portion of memory that can be erased, as will be described in greater detail below. Each memory block 102 generally comprises a fixed plurality of pages 104, which is the smallest size element that can be written or read from the non-volatile memory 100. Each page 104 generally is logically divided into two areas: a main area 106 and a spare area 108. For example, a typical non-volatile memory will have a main area 106 of 2048 bytes and a spare area 108 of 64 bytes.

Prior art non-volatile memory systems generally utilize the main area 106 to store user data and the spare area 108 to store non-volatile memory system data, which is not generally utilized by the user. The non-volatile memory system data typically includes error correction code (ECC), flags, pointers, and other data that is useful for the non-volatile memory system to operate, as illustrated by Table 1.

| blockState | Block state. non = 0xFF for bad block | 1 byte |
|---|---|---|
| chunkID | 32-bit chunk ID | 4 bytes |
| objectID | 32-bit object ID | 4 bytes |
| nBytes | Number of data bytes in this chunk | 2 bytes |
| blockSequence | sequence number for this block | 4 bytes |
| tagsEcc | ECC on tags area | 3 bytes |
| ecc | ECC, 3 bytes/256 bytes of data | 24 bytes |
| Total | | 42 bytes |

Table 1 illustrates exemplary prior art spare area 108 usage for the YAFFS2 flash file system, which is a public domain flash file system well known in the art. As shown in Table 1, typical flash file systems use the spare area to store, inter alia, the block state, logical and physical address mapping for the page or block, and error correction code logic. The bytes allowed for ECC in the prior art spare area 108 work adequately for Single Level Cell (SLC) memory, which contains one bit of data in each memory cell. However, as demand for greater functionality in devices has increased, so has demand for flash memory with greater storage capacity. To address such demands, multilevel-cell (MLC) memory has been developed. MLC memory cells contain two or more bits of data, thereby increasing the storage capacity of the device.

MLC memory is much less reliable than SLC memory. Because MLC devices have a higher intrinsic bit error rate, MLC devices require more powerful ECC. To support the required level of data integrity, MLC memory typically requires thirteen ECC check bytes for every 512 bytes of user data. Thus, for pages having a main area 106 of 2048 bytes, fifty-two check bytes are required. As can be appreciated from Table 1, utilizing fifty-two check bytes in the spare area 108 begins to cause space conflicts with other non-volatile memory system data stored in the spare area 108 utilizing prior art non-volatile memory management techniques.

In addition, unlike many other storage devices, non-volatile memory devices generally cannot be overwritten. Instead, to update data in a particular storage location within non-volatile memory, the location must first be erased, then the new data written in its place. Moreover, when erasing data in a flash device, an entire block must be erased instead of just the particular page or pages of the block that were updated. To facilitate this process, a typical flash controller will find a block of memory that has been previously erased and write the updated page to this new block at the same page offset. Then, the remaining pages of the old block are copied to the new block. Later, the old block is erased and made available for use by some other operation.

As can be appreciated writing data to memory in this manner can lead to problems unless a careful mapping of logical addresses to physical addresses is maintained. In prior art systems, this mapping generally is accomplished utilizing the spare area 108 of each page. Typically, in a page level mapping, the spare area 108 of each physical page 104 stores a logical address of the data that is physically written in the main area 106 of that page 104. To maintain this data in a usable format, prior art systems typically generate a page table at power-up, as illustrated next with reference to FIGS. 2A and 2B.

Figure 2A:
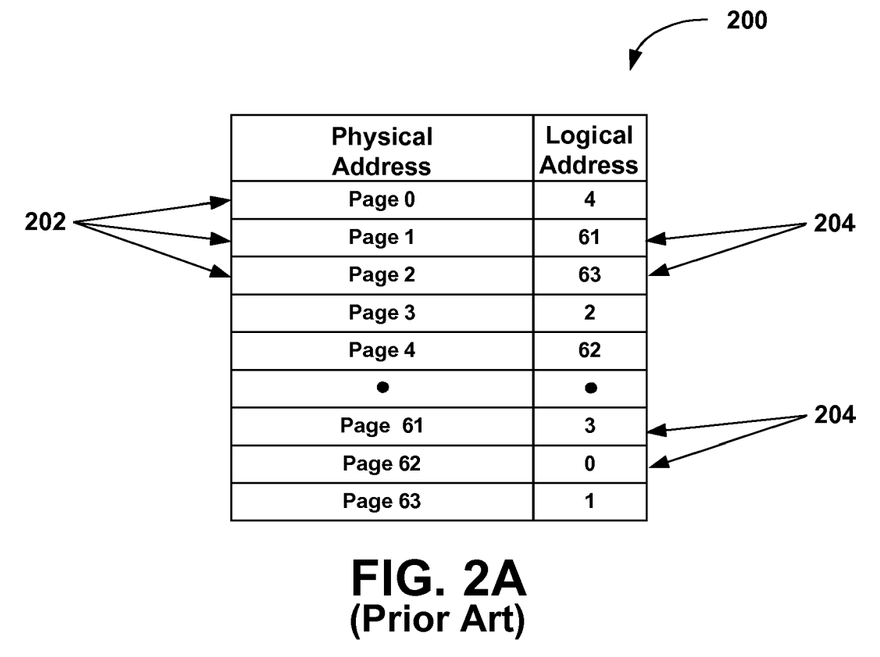
FIG. 2A is a table showing a prior art unsorted and unorganized block table generated during power-up.

FIG. 2A is a table showing a prior art unsorted and unorganized page table 200 generated during power-up. The prior art page table 200 comprises a plurality of physical page address entries 202 and a plurality of logical page address entries 204 and is generated each time the system powers-up. During power-up, prior art non-volatile memory systems using page level mapping typically examine the spare area 108 of each page 104 to obtain the logical address of the data that is physically written in the main area 106 of the particular page 104. This data is then entered into the page table 200 and the next page is examined. For example, the non-volatile memory system examines physical page 0 of block 0. In the example of FIG. 2A, the logical page address 4 is stored in the spare area 106 of page 0. Hence, the physical page 0 is associated with logical page 4 in the page table 200. The system then examines the spare area 108 of physical page 1 and finds, in the example of FIG. 2A, logical page address 61 stored in the spare area 108. Hence, the physical page 1 is associated with logical page 61 in the page table 200. This continues until all the spare area of all pages 104 in the non-volatile memory 100 have been examined and mapped to the page table 200. Once the address data is read into the page table 200, the page table 200 is sorted to make the data more usable to the system.

Figure 2B:
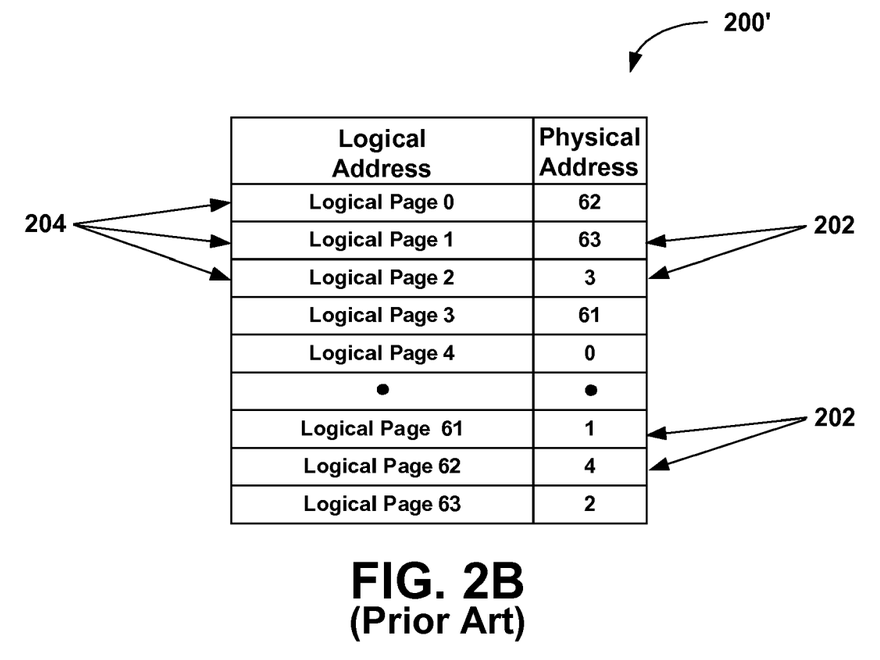
FIG. 2B is a table showing a prior art unsorted and organized block table sorted during power-up.

FIG. 2B is a table showing a prior art sorted and organized page table 200' sorted during power-up. In general, when sorting the page table 200', the system arranges the page table 200' in logical address 204 order. In this manner, when access to data associated with a particular logical address 204 is needed, the page table 200' can be consulted at the entry associated with the particular logical address 204 and the actual physical address 202 within non-volatile memory of the data can be determined. As can be appreciated, when there are a large number of pages in the non-volatile memory, the page table 200 can be large. As such, it can take a long time to generate, organize, and sort the data of the page table 200 each time the system powers-up.

In view of the foregoing, there is a need for systems and methods for providing memory management in a non-volatile memory. The systems and methods should allow for effective use of the spare area to allow adequate space for increased error correction code usage. In addition, the systems and methods should reduce the amount of time required during power-up to produce a usable table in system memory.

SUMMARY OF THE INVENTION

Broadly speaking, the present invention addresses these needs by providing memory management in a non-volatile memory system using a block table that is stored in a memory block of the non-volatile memory. Broadly speaking, embodiments of the present invention store information needed by the non-volatile memory file system, such as address mapping, block status, and wear leveling data, in a block table stored in a memory block in the non-volatile memory rather than spread out among the spare areas of the pages comprising the non-volatile memory.

For example, in one embodiment a method for memory management in a non-volatile memory which includes a plurality of memory blocks is disclosed. The method includes loading a block table from a memory block of the non-volatile memory into system memory. As mentioned above, the block table includes, inter alia, a plurality of entries mapping a physical block address of the non-volatile memory to a logical block address of the non-volatile memory. The block table is updated as data is accessed (i.e., read/write/erased) in the non-volatile memory, and the updated block table is stored into a memory block of the non-volatile memory. Generally, the block table is stored periodically and/or at system shutdown. In addition to mapping data, the block table can also include a plurality of wear level indicators, each being arranged to provide an indication of a wear level of a corresponding memory block, and memory block status flags to indicate the status of a corresponding memory block.

A non-volatile memory is disclosed in an additional embodiment of the present invention. The non-volatile memory includes a plurality of memory blocks each comprising a plurality of pages. Each page includes a main area and a spare area, and each spare area stores an indicator arranged to provide an indication of whether the block table is stored in the associated memory block. The block table is stored in a particular memory block. As above, the block table includes a plurality of entries mapping a physical block address of the non-volatile memory to a logical block address of the non-volatile memory. In addition, the indicator associated with the memory block storing the block table is set to indicate the block table is stored in that particular memory block. Generally, each indicator stored in a memory block not storing the block table is set to indicate the block table is not stored in the particular memory block. In this manner, the block table for the entire non-volatile memory can be stored in a single memory block of the non-volatile memory. As a result, the spare area of each page can store substantially only an indicator arranged to indicate whether the block table is stored in the associated memory block and an error correction code, thus allowing for more ECC data bits and therefore more complex ECC data checking.

A further method for memory management in a non-volatile memory which includes a plurality of memory blocks is disclosed in an additional embodiment of the present invention. The method includes examining the spare area of a plurality of memory blocks to obtain a particular memory block that has an indicator set to indicate the block table is stored in the particular memory block. The block table can then be loaded from the memory block storing the block table into system memory. As above, the block table includes a plurality of entries mapping a physical block address of the non-volatile memory to a logical block address of the non-volatile memory. The block table can be updated in system memory as data is accessed in the non-volatile memory, and later the updated block table can be stored into a selected memory block of the non-volatile memory. When the block table is stored into non-volatile memory, an indicator stored in a spare area of the selected memory block is set to indicate that the block table is stored in the selected memory block. In this manner, the selected memory block can be different than the particular memory block from which the block table was loaded. If different, the particular memory block from which the block table was loaded can be erased.

Hence, embodiments of the present invention advantageously allow the block table to be loaded into system memory in one operation rather than having to be reconstructed each time the system boots as is required in prior art designs. In addition, because embodiments of the present invention generally only require one byte in the spare area of each memory block or page, the remainder of the spare area can be utilized for ECC data, thus allowing for complex ECC data checking. Moreover, because the block table is itself stored in a memory block of the non-volatile memory, the data stored in the block table has all the data integrity protection afforded to user data, such as only being written to blocks that are good and also being protected by ECC. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for providing memory management in a non-volatile memory system using a block table that is stored in a memory block of the non-volatile memory. Broadly speaking, embodiments of the present invention store information needed by the non-volatile memory file system, such as address mapping, block status, and wear leveling data, in a block table. The block table is stored in a memory block of the non-volatile memory rather than spread out among the spare areas of the pages comprising the non-volatile memory. In this manner, system startup is enhanced because the entire block table can be loaded into system memory all at once, rather than being pieced together from data scattered throughout the non-volatile memory. Moreover, because the data for the non-volatile memory file system is stored in the entries of the block table and not in the spare areas of the memory blocks, the spare areas can be better utilized for error correction code data.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 3:
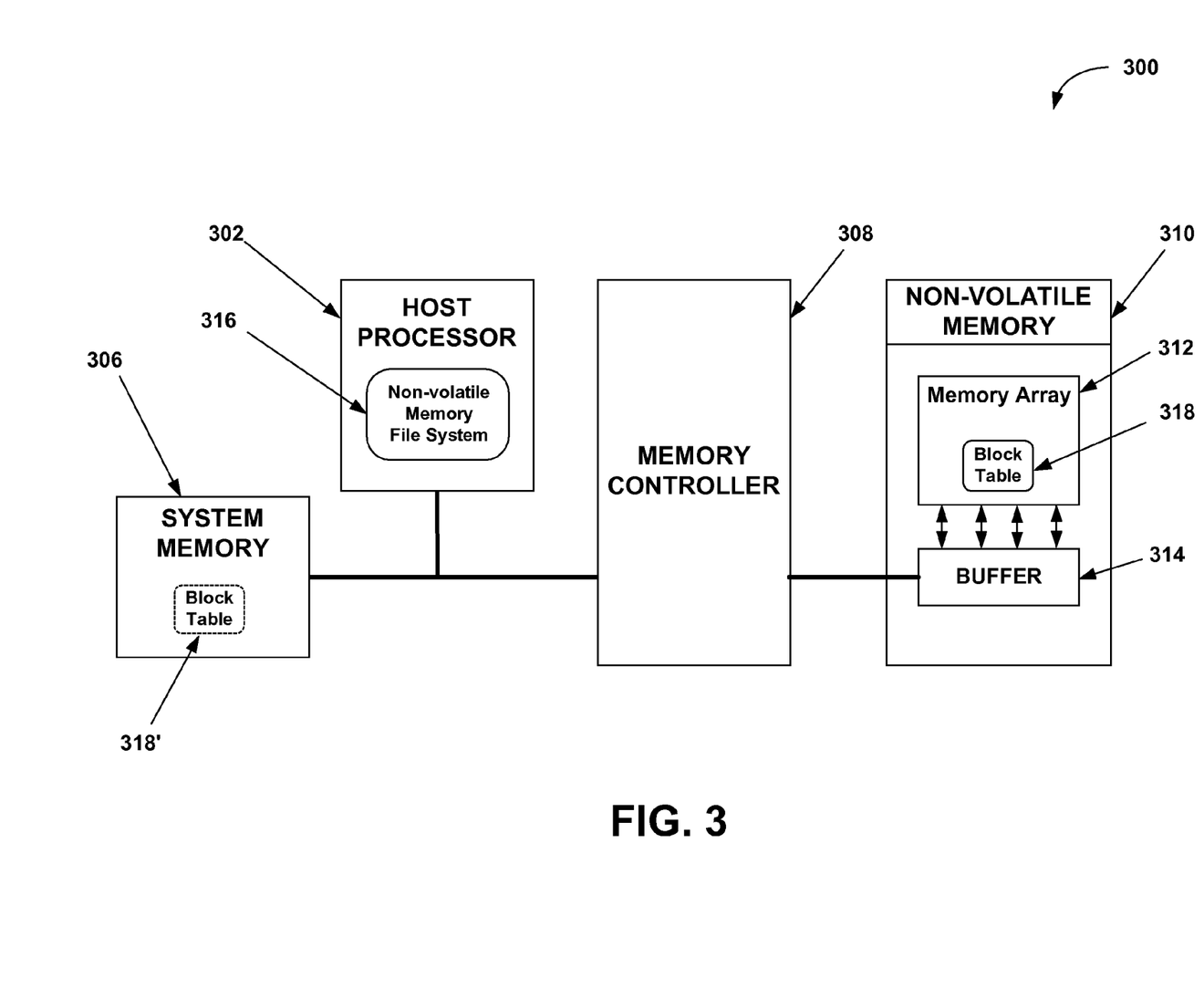
FIG. 3 is a diagram showing a system, which includes a block table stored in non-volatile memory, in accordance with an embodiment of the present invention.

FIGS. 1, 2A, and 2B were described in terms of the prior art. FIG. 3 is a diagram showing a system 300, which includes a block table stored in non-volatile memory, in accordance with an embodiment of the present invention. The system 300 includes a host processor 302 coupled to system memory 306 and a memory controller 308. The memory controller 308 is in communication with a non-volatile memory 310, which includes a memory array 312 coupled to a buffer 314. It should be noted that the non-volatile memory 310 can be any type of non-volatile memory, such as PCM, flash memory, or any other type of non-volatile memory as will be apparent to those skilled in the art after a careful reading of the present disclosure.

Executing on the host processor 302 is a non-volatile memory file system 316, which is utilized by the system 300 to access data stored in the non-volatile memory 310. Although the non-volatile memory file system 316 is shown executing on the host processor 302 in the example of FIG. 3, it should be noted that the non-volatile memory file system 316 can run on other processors as needed by the system 300. In addition, a block table 318 is stored in a memory block of the memory array 312 of the non-volatile memory 310. As will be described in greater detail subsequently, the block table 318 stores much of the data needed by the non-volatile memory file system 316 for accessing data stored in the non-volatile memory 310. For example, the block table 318 includes address mapping, block status, and wear leveling data for the non-volatile memory 310.

As mentioned above, careful memory management is needed when operating non-volatile memory systems. Hence, at power-up the block table 318 is loaded from the non-volatile memory 310 into system memory 306. The block table 318' loaded in system memory 306 then is utilized by the non-volatile memory file system 316 to access data in the non-volatile memory 310. For example, to access data in the non-volatile memory 310, the non-volatile memory file system 316 examines the block table 318' stored in system memory 306 to determine the physical address of a particular logical address that the system 300 wants to access. The non-volatile memory file system 316 then instructs the memory controller 308 to access the data in the memory array 312 at the particular physical address. As data is being accessed and moved in the non-volatile memory 310, the block table 318' in system memory 306 is updated to reflect the changes in the data stored in the non-volatile memory 310. Periodically, and at system shutdown, the block table 318' stored in system memory 306 is written to the non-volatile memory 310. As will be described in greater detail below, the block table 318 can be written to a different location within the memory array 312 of the non-volatile memory 310 each time the block table 318 is written to the non-volatile memory 310.

Figure 4:
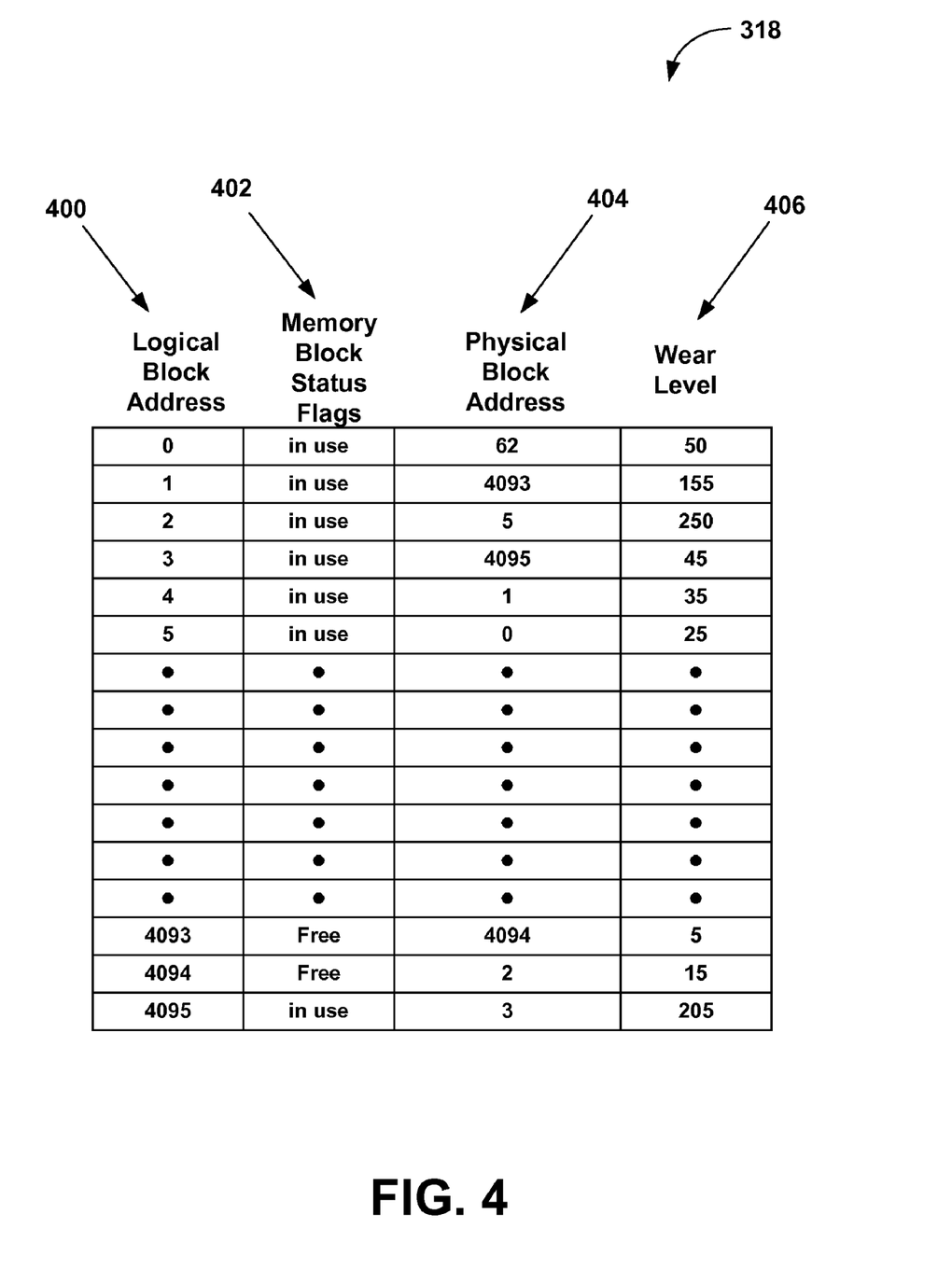
FIG. 4 is an illustration showing an exemplary block table, in accordance with an embodiment of the present invention.

FIG. 4 is an illustration showing an exemplary block table 318, in accordance with an embodiment of the present invention. The block table 318 includes logical block addresses 400, memory block status flags 402, physical block addresses 404, and wear level indicators 406. It should be noted, however, that a block table 318 of the embodiments of the present invention can include any data useful to the non-volatile file system in the operation of the non-volatile memory, as will be apparent to those skilled in the art after a careful reading of the present disclosure.

Each row of the bock table 318 corresponds to a particular logical block address 400, which is the memory block address used by the system when requesting data from the non-volatile memory. Thus, the data in each row of the block table 318 corresponds to the particular logical address 400 listed in the logical block address column of the block table 318. For example, the memory block status flags 402, physical address data 404, and wear level indicators 406 on row 1 of the block table 318 correspond to the logical address 1.

As mentioned above, each row of the block table 318 includes memory block status flags 402, a physical block address 404, and a wear level indicator 406. The memory block status flags 402 indicate the availability of a particular block. For example, the memory block status flags 402 can be utilized to indicate whether a particular block is bad (i.e., worn out), currently in use, free, or old data but not yet erased. The physical block address 404 stores the actual physical address in the non-volatile memory of the data associated with the corresponding logical address 400. Finally, the wear level indicator 406 stores the wear level for the associated physical block address 404. Generally, the wear level indicator 406 provides an indication of the wear level of the particular physical block address relative to the other physical block addresses in the non-volatile memory. The wear level data is utilized by the non-volatile memory file system to provide more even wear or use of the different memory block locations in the non-volatile memory.

In operation, the non-volatile memory file system utilizes the block table 318 when accessing the non-volatile memory. In this manner, the non-volatile memory file system can determine which memory block locations are available for storing data, which memory block locations have lower wear levels and thus provide wear leveling, and the actual physical block address 404 of any particular logical block address 400 provided by the system. As data is written to and moved about the non-volatile memory, the block table 318 is updated to reflect the changes.

In addition, as mentioned above, the block table 318 periodically is written to a memory block of the non-volatile memory. In one embodiment, the block table 318 is written to the non-volatile memory in a manner similar to other data. However, in addition to writing the block table 318 to memory, embodiments of the present invention set a block table indicator in the spare area of the memory block to indicate the block table 318 is stored in that memory block. In this manner, the block table 318 can be easily located during power-up, as described next with reference to FIG. 5.

Figure 5:
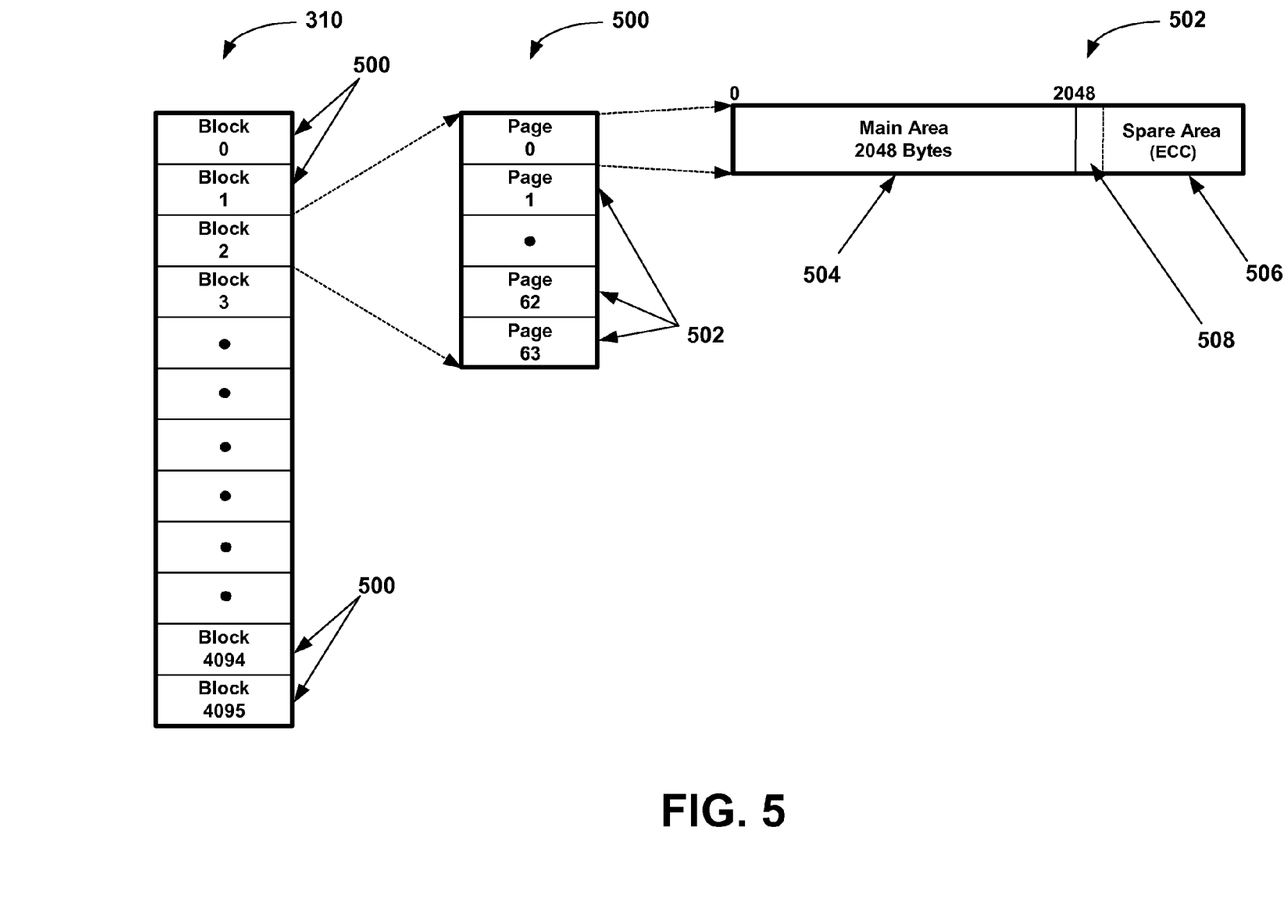
FIG. 5 is an illustration showing an exemplary non-volatile memory utilizing a block table stored in non-volatile memory, in accordance with an embodiment of the present invention.

FIG. 5 is an illustration showing an exemplary non-volatile memory 310 utilizing a block table stored in non-volatile memory, in accordance with an embodiment of the present invention. As illustrated in FIG. 5, the non-volatile memory 310 generally comprises a plurality of memory blocks 500, which generally is the smallest portion of memory that can be erased. Each memory block 500 generally comprises a fixed plurality of pages 502, which is the smallest size element that can be written or read from the non-volatile memory 310. Each page 502 is logically divided into two areas: a main area 504 and a spare area 506. For example, a non-volatile memory can have a main area 504 of 2048 bytes and a spare area 506 of 64 bytes. The main area 504 stores user data, while the spare area 506 stores non-volatile memory system data, which is not generally utilized by the user.

As mentioned above, prior art non-volatile memory systems generally utilize the spare area to store flags, pointers, wear level data, and error correction codes (ECC), and other data that is useful for the non-volatile memory system to operate. Embodiments of the present invention, however, advantageously store the flags, pointers, wear level data, and other data that may be useful to the non-volatile memory file system in the block table. In this manner, embodiments of the present invention leave the spare area 506 available for storing other data, for example additional ECC data.

More specifically, embodiments of the present invention utilize a block table indicator 508 in a spare area of each memory block to indicate whether the block table is currently stored at that location. In one embodiment, the block table indicator 508 is a one byte flag that is either set or not set, depending on whether the block table is currently stored at that location. The memory block storing the current block table has the block table indicator 508 set, while all other memory blocks have the block table indicator 508 not set. For example, a zero value stored in the block table indicator 508 byte indicates the block table indicator 508 is not set and the block table is not stored in that memory block. A nonzero value stored in the block table indicator 508 byte can be utilized to indicate that block table indicator 508 is set and the block table is stored in that memory block.

In one embodiment, the spare area 506 of the first page 502 in each memory block 500 is utilized to store the block table indicator 508. However, it should be noted that any spare area location can be utilized to store the block table indicator 508. For example, each page 502 of each memory block 500 can store a block table indicator 508 byte, or other pages within each memory block 500 can be utilized to store a block table indicator 508 byte, as will be apparent to those skilled in the art after a careful reading of the present disclosure. In this manner, during power-up the non-volatile memory file system can examine the spare area 506 of each memory block 500 to find the memory block 500 having the block table indicator 508 byte set. Once the memory block 500 having the block table indicator 508 byte set is found, the current block table can be loaded from that memory block.

Figure 6:
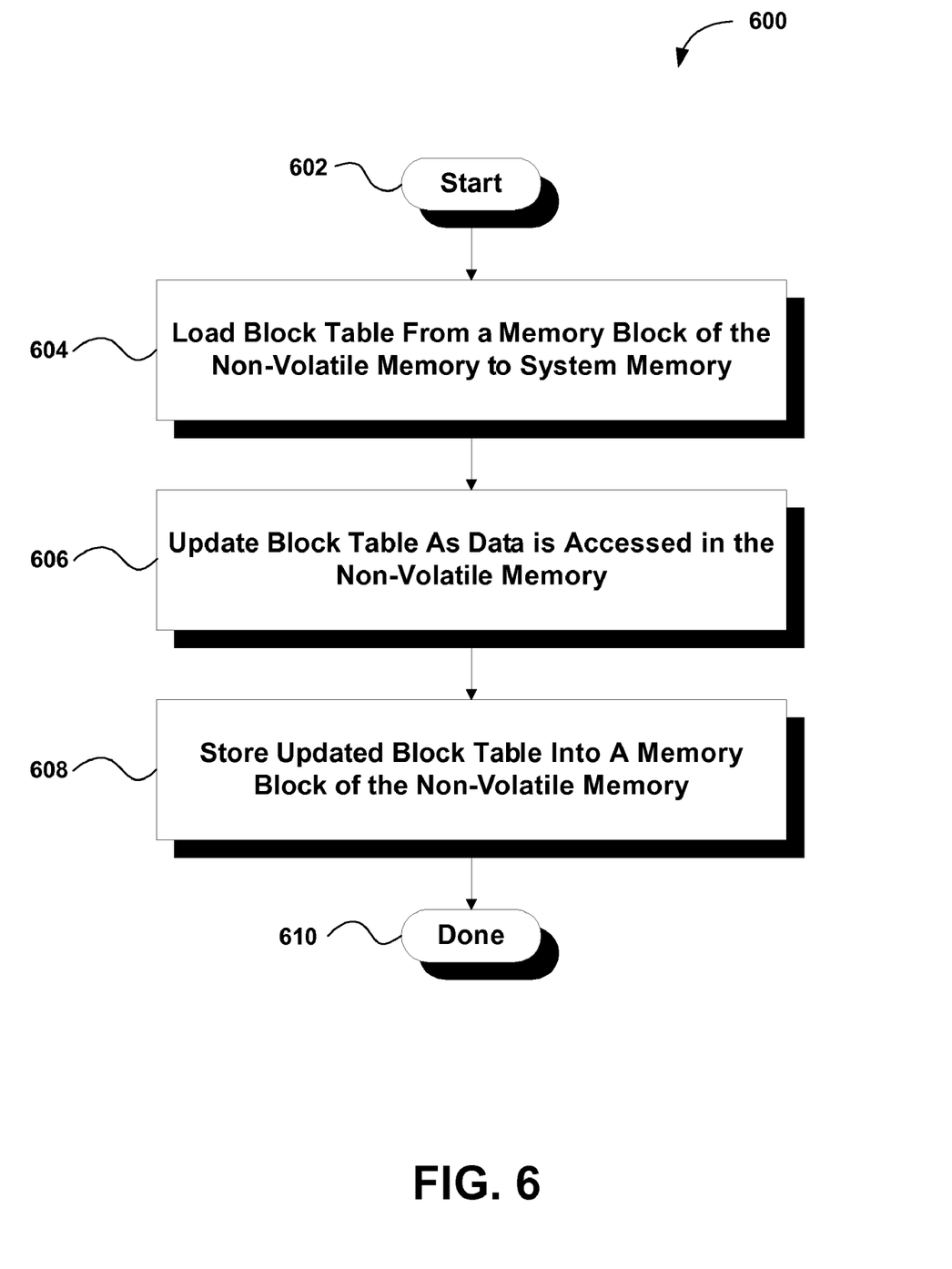
FIG. 6 is a flowchart showing a method for providing memory management in a non-volatile memory using a block table stored in non-volatile memory, in accordance with an embodiment of the present invention.

FIG. 6 is a flowchart showing a method 600 for providing memory management in a non-volatile memory using a block table stored in non-volatile memory, in accordance with an embodiment of the present invention. In an initial operation 602, preprocess operations are performed. Preprocess operations can include, for example, loading non-volatile memory file system into system memory, loading boot block data into system memory, and other preprocess operations that will be apparent to those skilled in the art after a careful reading of the present disclosure.

Figure 7:
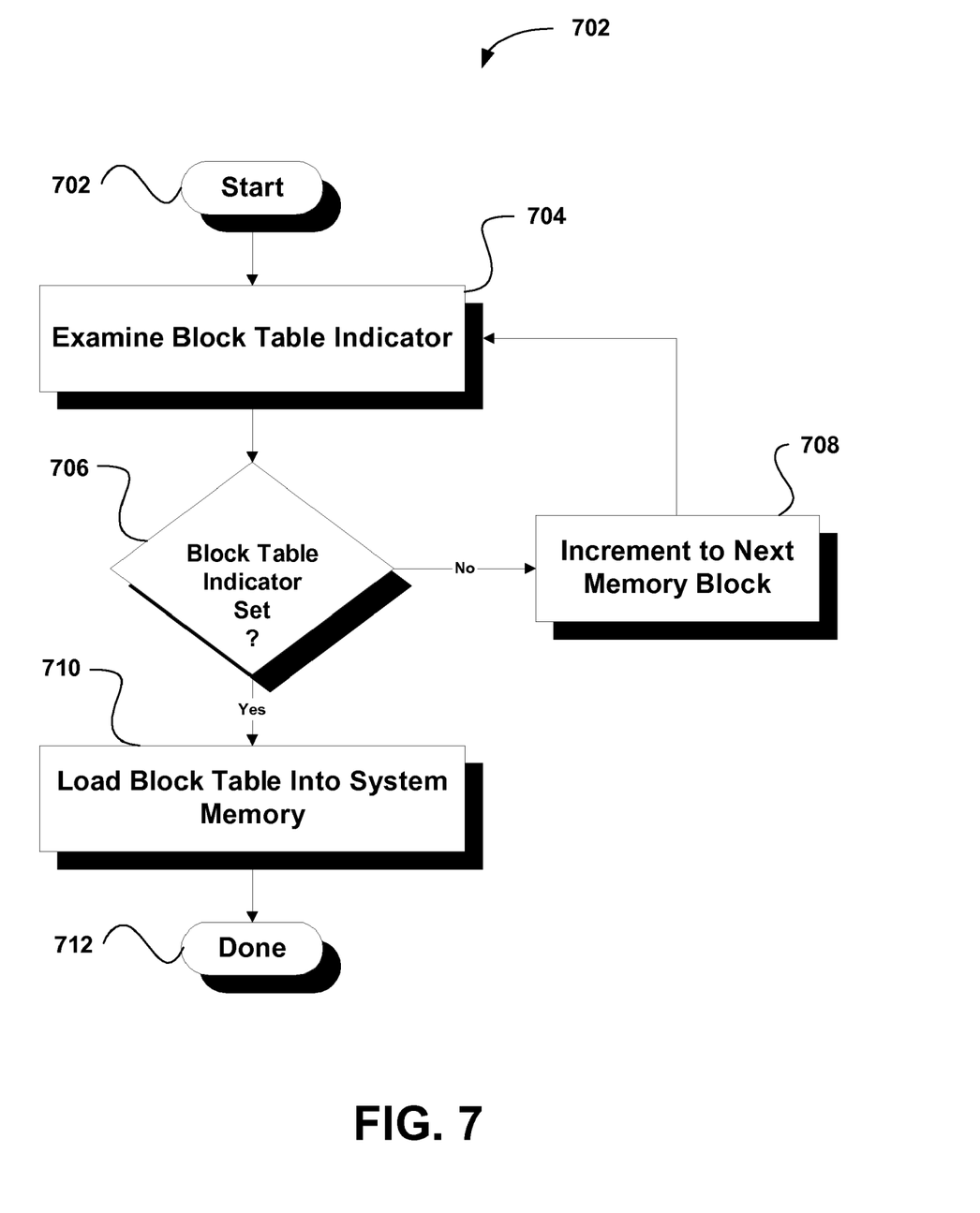
FIG. 7 is a flowchart showing a method for loading the block table from non-volatile memory to system memory, in accordance with an embodiment of the present invention.

In operation 604, the block table is loaded from a memory block of the non-volatile memory into system memory. As mentioned above, during power-up the block table is read from non-volatile memory and stored in system memory for use by the non-volatile memory file system. FIG. 7 is a flowchart showing a method 700 for loading the block table from non-volatile memory to system memory, in accordance with an embodiment of the present invention. In an initial operation 702, preprocess operations are performed. Preprocess operation can include, for example, loading the non-volatile memory file system into system memory, initializing a memory counter, and other preprocess operations that will be apparent to those skilled in the art after a careful reading of the present disclosure.

In operation 704, the block table indicator in the spare area of the memory block is examined. In one embodiment, a memory counter can be used to indicate the memory block that is to be examined next. Referring to FIG. 5, the spare area 506 of this memory block 500 is examined to determine whether or not the block table indicator 508 byte has a non-zero value, and thus whether or not the block table indicator 508 is set. As mentioned previously, in one embodiment the spare area 506 of the first page 502 (i.e., page 0) in each memory block 500 is utilized to store the block table indicator 508 byte. In this embodiment, the spare area 506 of the first page 502 of each memory block 500 is examined to determine whether block table indicator 508 is set. In this manner, less memory locations need to be examined to find the block table.

Referring back to FIG. 7, a determination is then made as to whether the block table indicator is set, in operation 706. As mentioned previously, in one embodiment a zero value stored in the block table indicator byte can indicate the block table indicator 508 is not set, while a nonzero value stored in the block table indicator byte can be utilized to indicate that block table indicator 508 is set. If the block table indicator is not set, the method 700 branches to operation 708. However, if the block table indicator is set, the method 700 continues to operation 710.

In operation 708, the method 700 increments to the next memory block in the non-volatile memory and examines the block table indicator in another operation 704. As mentioned above, a memory counter can be utilized to indicate which memory block should be examined. In this embodiment, the memory counter is incremented in operation 708 to the next memory block for examination. In this manner, the non-volatile memory is searched to determine which memory block has the block table indicator of its spare area set.

When the block table indicator is set, the block table stored in the memory block is loaded into system memory, in operation 710. Referring to FIG. 5, the block table indicator 508 byte is utilized to indicate which memory block in the non-volatile memory stores the current block table. In one embodiment, generally only one block table indicator will be set during power-up. The memory block having the block table indicator set is the memory block storing the current block table. Hence, as illustrated in FIG. 3, at power-up the block table 318 is loaded from the non-volatile memory 310 into system memory 306. In this manner, the block table 318' loaded in system memory 306 can be utilized by the non-volatile memory file system 316 to access data in the non-volatile memory 310.

Referring back to FIG. 7, post process operations then are performed in operation 712. Post process operations can include, for example, utilization of the block table during non-volatile memory access, updating of the block table during operation, and other post process operations that will be apparent to those skilled in the art after a careful reading of the present invention. In this manner, embodiments of the present invention can utilize all remaining bytes of the spare area for use other than mapping, block status, and wear leveling. For example, because embodiments of the present invention generally only utilize one byte of the spare area of each memory block or page for a block table indicator, the spare area of each memory block or page can to be utilized substantially for ECC data.

Turning back to FIG. 6, once the block table has been loaded into system memory, the block table is updated as data is accessed (i.e., read/written/erased/moved) in the non-volatile memory. As illustrated in FIG. 3, the block table 318' loaded in system memory 306 is utilized by the non-volatile memory file system 316 to access data in the non-volatile memory 310. The term "accessed" as used in the present description refers to any type of interaction with data in the non-volatile memory, such as reading data, writing data, moving data, and/or erasing data. Thus, the block table 318' in the system memory is updated as data is read, written, moved, and erased in the non-volatile memory. For example, to access data in the non-volatile memory 310, the non-volatile memory file system 316 examines the block table 318' stored in system memory 306 to determine the physical address of a particular logical address that the system 300 wants to access. The non-volatile memory file system 316 then instructs the memory controller 308 to access the data in the memory array 312 at the particular physical address. As data is being accessed and moved in the non-volatile memory 310, the block table 318' in system memory 306 is updated to reflect the changes in the data stored in the non-volatile memory 310, as discussed next with reference to FIG. 8.

Figure 8:
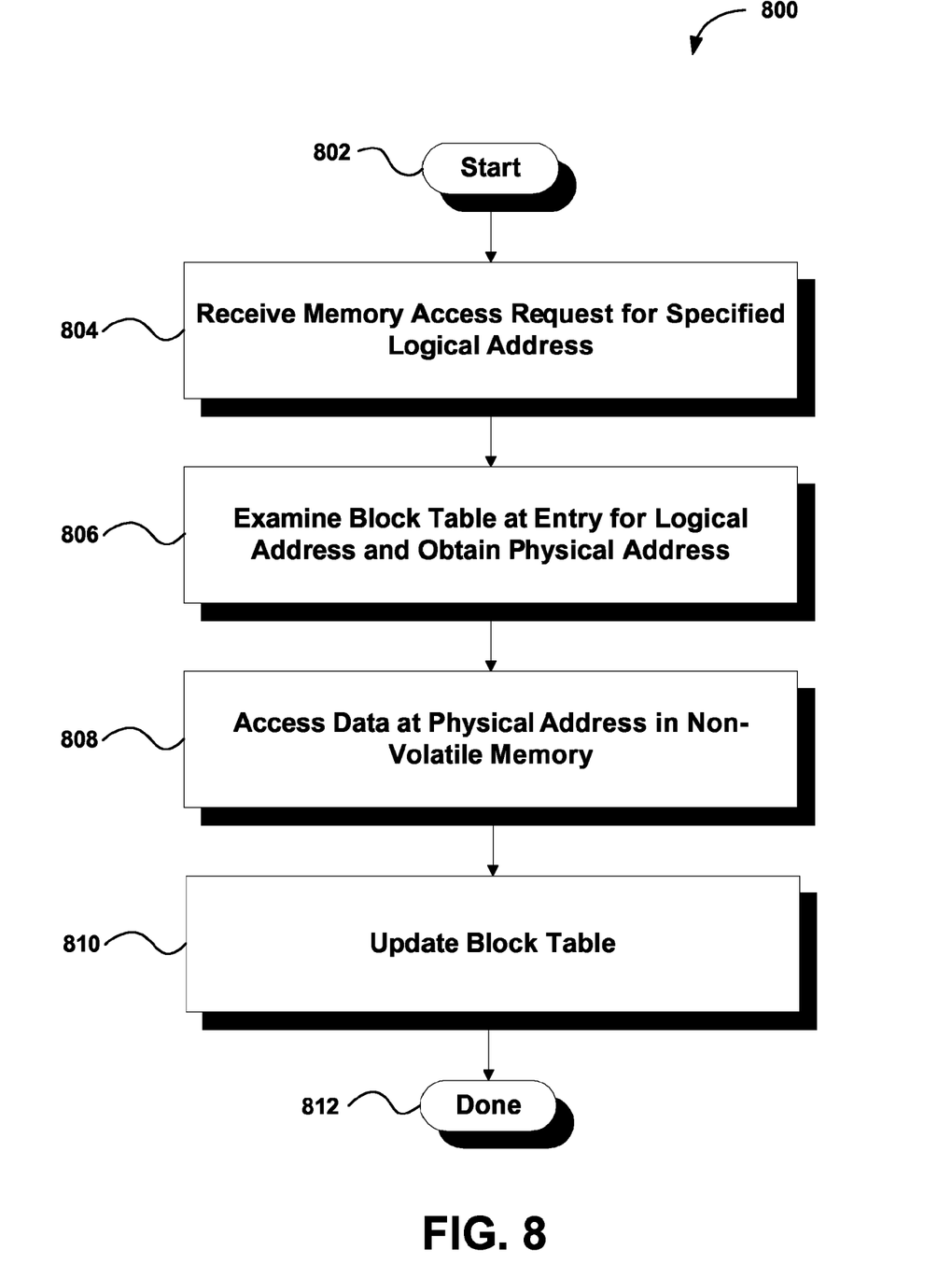
FIG. 8 is a flowchart showing a method for updating the block table as data is accessed in the non-volatile memory, in accordance with an embodiment of the present invention.

FIG. 8 is a flowchart showing a method 800 for updating the block table as data is accessed in the non-volatile memory, in accordance with an embodiment of the present invention. In an initial operation 802 preprocess operations are performed. Preprocess operations can include, for example, searching the non-volatile memory for a set block table indicator, loading the block table into system memory, and other operations that will be apparent to those skilled in the art after a careful reading of the present disclosure.

In operation 804, a memory access request for a specified logical address is received. Referring to FIG. 3, when the host processor 302 needs access to the non-volatile memory, the host processor 302 generally sends a request to the non-volatile memory file system 316 indicating a particular logical address to which access is needed. In this manner, the non-volatile memory file system 316 handles the communication with the non-volatile memory 310 utilizing the block table 318' and memory controller 308.

Referring back to FIG. 8, the block table is examined to determine a physical address in the non-volatile memory related to the logical address received in the memory access request. Referring to FIG. 4, in one embodiment, when reading data from the non-volatile memory, the non-volatile memory file system examines the block table 318' at the particular logical block address 400 provided in the memory access request received from the system. The non-volatile memory file system then obtains the corresponding physical block address 404 from the block table 318', which indicates the physical address in the non-volatile memory of the data corresponding to the received logical address 400.

When writing data to the non-volatile memory, one embodiment of the present invention uses the non-volatile memory file system to examine the memory block status flags 402 to determine a free memory block in which to write the data. In addition, the non-volatile memory file system examines the wear level indicators 406 to determine a low use memory block from among the free memory blocks in which to store the data. Once the non-volatile memory file system finds an appropriate memory block, the non-volatile memory file system obtains the corresponding physical block address 404, which indicates the physical address in non-volatile memory at which the data will be written.

Referring back to FIG. 8, the data at the obtained physical address is accessed, in operation 808. Once the non-volatile memory file system obtains an appropriate physical address from the block table, the non-volatile memory file system can accessed the non-volatile memory. For example, turning to FIG. 3, to access a particular location in the non-volatile memory 310, the non-volatile memory file system 316 provides a memory access request along with the physical address to the memory controller 308. The memory controller 308 then accesses the non-volatile memory 310 at the particular physical address.

For example, when reading data from the non-volatile memory 310, the memory controller 308 provides a read request to the non-volatile memory 310 with the physical address. The non-volatile memory 310 then copies the data at the physical address in the memory array 312 to the buffer 314. The data in the buffer 314 then is provided to the memory controller 308, which generally performs ECC data checking on the data and transfers the data to the system memory 306. When writing data to the non-volatile memory 310, the memory controller 308 generally generates ECC data for the data and provides the data and ECC data to the buffer 314 of the non-volatile memory 310. In addition, the memory controller 308 provides a write request to the non-volatile memory 310 along with the physical address. The non-volatile memory 310 then copies the data and ECC data from the buffer 314 to the physical address within the memory array 312.

Turing back to FIG. 8, the block table is updated in operation 810. As data is written to and erased from non-volatile memory, the block table is updated to reflect these changes. For example, referring to FIG. 4, when data is written to particular physical address in the non-volatile memory, the physical block address 404 corresponding to the particular logical block address 400 is updated to reflect the new physical address of the logical address. In addition, wear level indicators 406 can be updated as memory blocks are erased and memory block status flags 402 can be updated as the memory blocks are used, erased, and deemed no longer suitable for use.

Referring back to FIG. 8, post process operations are performed in operation 812. Post process operations can include, for example, additional update of the block table, storing of the block table to the non-volatile memory, and other post process operations that will be apparent to those skilled in the art after a careful reading of the present disclosure.

Turning back to FIG. 6, the updated block table is stored into a memory block of the non-volatile memory, in operation 608. As mentioned previously, periodically and at shutdown the block table is written to a memory block on non-volatile memory. In this manner, during power-up the entire block table can be read at once from the non-volatile memory rather than being pieced together from various locations in the non-volatile memory.

Figure 9:
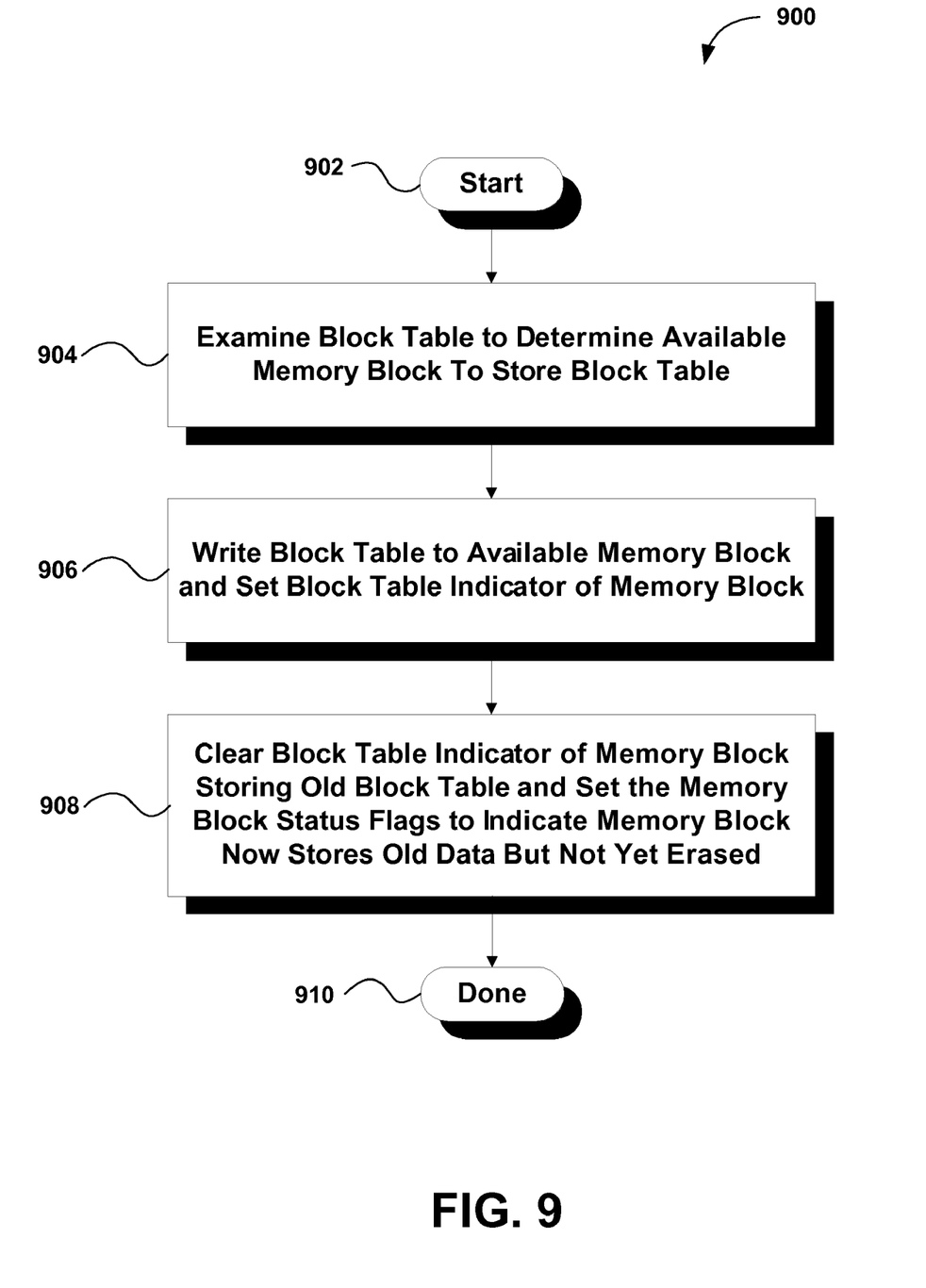
FIG. 9 is a flowchart showing a method 900 for storing the updated block table into a memory block of the non-volatile memory, in accordance with an embodiment of the present invention.

FIG. 9 is a flowchart showing a method 900 for storing the updated block table into a memory block of the non-volatile memory, in accordance with an embodiment of the present invention. In an initial operation 902, preprocess operations are performed. Preprocess operations can include, for example, loading the block table into system memory, updating the block table during use, and other preprocess operations that will be apparent to those skilled in the art after a careful reading of the present disclosure.

In operation 904, the block table is examined to determine an available memory block to store the block table. Referring to FIG. 4, during operation 904, the non-volatile memory file system examines the memory block status flags 402 and the wear level indicators 406 in the block table 318' to find a memory block that is both available and has a relatively low wear level. Once a suitable memory block is found in the block table 318', the corresponding physical block address 404 of the memory block is obtained for writing the block table to non-volatile memory.

Turning back to FIG. 9, the block table is written to the available memory block at the obtained physical memory address in the non-volatile memory and the block table indicator in the spare area of the memory block is set. As mentioned previously, the block table indicator byte is utilized to indicate which memory block in the non-volatile memory stores the current block table. In one embodiment, generally only one block table indicator will be set during power-up. The memory block having the block table indicator set is the memory block storing the current block table.

In operation 908, the block table indicator of the memory block storing the old block table is cleared and the memory block availability indicator for the memory block is set to indicate the memory block stores old data but has not yet been erased. By clearing the block table indicator of the memory block storing the old block table, embodiments of the present invention avoid confusion as to which memory block stores the current block table. Hence, generally only one block table indicator should be set in the non-volatile memory after operation 908. In addition, setting the memory block status flags for the memory block storing the old block table to indicate the memory block stores old data allows the system to reclaim the memory block for use when time permits.

By use of the block table indictor byte, the block table can be stored in substantially any usable location within the non-volatile memory. As a result, wear leveling can be maintained despite frequent storing and erasing of the block table. Post process operations can then be performed in operation 910. Post process operations can include, for example, continued use of the block table, additional writing and erasing of the block table in non-volatile memory, and other post process operations that will be apparent to those skilled in the art after a careful reading of the present disclosure.

Referring back to FIG. 6, post process operations are performed in operation 610. Post process operations can include, for example, additional updating of the block table, erasing the memory block storing the old block table, and other post process operations that will be apparent to those skilled in the art after a careful reading of the present disclosure. In this manner, embodiments of the present invention advantageously allow the block table to be loaded into system memory in one operation rather than having to be reconstructed each time the system boots as is required in prior art designs. In addition, because embodiments of the present invention generally only require one byte in the spare area of each memory block or page, the remainder of the spare area can be utilized for ECC data, thus allowing for complex ECC data checking. Moreover, because the block table is itself stored in a memory block of the non-volatile memory, the data stored in the block table has all the data integrity protection afforded to user data, such as only being written to blocks that are good and also being protected by ECC.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for memory management in a non-volatile memory which includes a plurality of memory blocks, comprising the operations of:
    loading a block table from a memory block of the non-volatile memory into system memory, the block table comprising a plurality of entries mapping a physical block address of the non-volatile memory to a logical block address of the non-volatile memory;
    updating the block table in the system memory as data is accessed in the non-volatile memory; and
    storing the updated block table into a memory block of the non-volatile memory.

2. A method as recited in claim 1, wherein the updated block table is stored in a memory block different than the memory block the block table was loaded from.

3. A method as recited in claim 1, further comprising the operation of setting an indicator stored in the memory block storing the block table, the indicator being arranged to provide an indication that the block table is stored in the memory block.

4. A method as recited in claim 3, wherein each memory block of the plurality of memory blocks includes an indicator arranged to provide an indication of whether the block table is stored in the memory block.

5. A method as recited in claim 3, further comprising examining a plurality of memory blocks of the non-volatile memory to obtain a memory block having the indicator set.

6. A method as recited in claim 4, further comprising the operation of loading the block table from the memory block having the indicator set.

7. A method as recited in claim 1, wherein the block table further comprises a plurality of wear level indicators, each wear level indicator being arranged to provide an indication of a wear level of a corresponding memory block.

8. A non-volatile memory, comprising:
    a plurality of memory blocks each comprising a plurality of pages, wherein each page comprises a main area and a spare area, wherein each spare area includes an indicator arranged to provide an indication of whether a block table is stored in an associated memory block;
    a block table stored in a particular memory block, the block table comprising a plurality of entries mapping a physical block address of the non-volatile memory to a logical block address of the non-volatile memory, wherein the indicator associated with the particular memory block is set to indicate the block table is stored in the particular memory block.

9. A non-volatile memory as recited in claim 8, wherein each indicator stored in a memory block not storing the block table is set to indicate the block table is not stored in the memory block.

10. A non-volatile memory as recited in claim 8, wherein the block table further comprises a plurality of wear level indicators, each wear level indicator being arranged to provide an indication of a wear level of a corresponding memory block.

11. A non-volatile memory as recited in claim 8, wherein the block table is stored in a single memory block of the non-volatile memory.

12. A non-volatile memory as recited in claim 8, wherein each spare area of each page stores an error correction code for the associated page.

13. A non-volatile memory as recited in claim 12, wherein the spare area of each page stores substantially only an indicator arranged to indicate whether the block table is stored in the associated memory block and an error correction code.

14. A method for memory management in a non-volatile memory which includes a plurality of memory blocks, comprising the operations of:
examining a plurality of memory blocks to obtain a particular memory block having an indicator set to indicate that a block table is stored in the particular memory block;
loading the block table from the particular memory block into system memory, the block table comprising a plurality of entries mapping a physical block address of the non-volatile memory to a logical block address of the non-volatile memory;
updating the block table in system memory as data is accessed in the non-volatile memory; and
storing the updated block table into a selected memory block of the non-volatile memory; and
setting an indicator stored in the selected memory block to indicate that the block table is stored in the selected memory block.

15. A method as recited in claim 14, wherein the selected memory block is different than the particular memory block from which the block table was loaded.

16. A method as recited in claim 14, wherein each memory block includes a plurality of pages, each page of the plurality of pages including a spare area storing an indicator arranged to provide an indication of whether the block table is stored in a memory block storing the page.

17. A method as recited in claim 14, wherein the block table further comprises a plurality of wear level indicators, each wear level indicator being arranged to provide an indication of a wear level of a corresponding memory block.

18. A method as recited in claim 14, further comprising the operation of erasing the particular memory block from which the block table was loaded.

19. A method as recited in claim 14, wherein the block table further comprising a plurality of entries indicating an availability of an associated memory block.

* * * * *